United States Patent
Mott et al.

(10) Patent No.: US 6,574,695 B1
(45) Date of Patent: Jun. 3, 2003

(54) SYSTEM AND METHOD FOR PROVIDING HOT SWAP CAPABILITY USING EXISTING CIRCUITS AND DRIVERS WITH MINIMAL CHANGES

(75) Inventors: James Mott, Oakland, CA (US); Arvind Kini, Fremont, CA (US); David Redman, Fremont, CA (US); Nancy Lee, Menlo Park, CA (US); Ashish Munjal, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/478,929

(22) Filed: Jan. 6, 2000

(51) Int. Cl.[7] ............................................... G06F 13/00
(52) U.S. Cl. ...................................... 710/302; 710/313
(58) Field of Search ................................ 710/301, 302, 710/303, 304, 100, 107, 60, 9, 310, 314, 313, 316, 306

(56) References Cited

U.S. PATENT DOCUMENTS

| 5,784,576 | A |   | 7/1998 | Guthrie et al. |
| 5,875,308 | A |   | 2/1999 | Egan et al. |
| 5,918,026 | A | * | 6/1999 | Melo |
| 6,112,311 | A | * | 8/2000 | Beardsley et al. |
| 6,418,492 | B1 | * | 7/2002 | Papa et al. |

FOREIGN PATENT DOCUMENTS

EP         0772134 A1     5/1997

OTHER PUBLICATIONS

Intel®, *21554 PCI–to–PCI Bridge for Embedded Applications, Hardware Reference Manual*, Sep. 1998, Chapter 2, pp. 1–8; Chapter 3, p. 10; and Chapter 16, p. 17.

Lieberman, "But PICMG specification allows for differentiation, too—CompactPCI group specifies hot–swap levels," EE Times, Issue 1005, May 1998, 5 pgs.

Fisher, "CompactPCI specifications corner," reprinted from CompactPCI Systems, Spring 1998, 3 pgs.

"CompactPCI vs. Industrial PC's," Jan. 1997, 8 pgs.

"21554 Embedded PCI–to–PCI Bridge," © 1999 Intel Corporation, 4 pgs.

\* cited by examiner

*Primary Examiner*—Sumati Lefkowitz
*Assistant Examiner*—Kim T. Huynh
(74) *Attorney, Agent, or Firm*—Meyertons Hood Kivlin Kowert & Goetzel, P.C.; B. Noël Kivlin

(57) ABSTRACT

A system and method for providing hot swap capability with minimal changes in a system which uses existing circuitry and drivers. In one embodiment, a computer system has a host processor and a hot-swap-capable device, each coupled to a Compact PCI bus. The device includes one or more pre-existing circuits (ASICs and/or standard off-the-shelf circuits) and corresponding pre-existing drivers. A hot-swap-capable bus bridge is interposed between the circuits and the Compact PCI bus to provide hot swap functionality while allowing the pre-existing circuits and drivers to be used without modification. In one embodiment, an Intel 21554 is used as the hot-swap-capable bus bridge. The 21554 is programmed to emulate a transparent bridge. Modified drivers in the OBP firmware and OS software allow the system to recognize the 21554 in this transparent configuration and to probe the secondary side of the 21554 for the circuits.

23 Claims, 2 Drawing Sheets

SYSTEM AND METHOD FOR PROVIDING HOT SWAP CAPABILITY USING EXISTING CIRCUITS AND DRIVERS WITH MINIMAL CHANGES

BACKGROUND OF THE INVENTION

1. Field of the Invention

The present invention relates generally to computer systems and more specifically to a system and method for providing hot swap capability in a computer peripheral device wherein the device and corresponding software drivers did not fully support hot swap functions.

2. Description of Related Art

Most modern desktop computers incorporate a local bus which is compliant with the Peripheral Component Interconnect (PCI) standard. The PCI bus is not truly a local bus (i.e., one which enables data transfer between the processor and memory/cache subsystems,) but is instead an intermediate bus which is coupled to the processor by a PCI bridge/controller. Data can be transferred to devices on the PCI bus through the bridge/controller, which typically buffers the data and allows the processor to perform other tasks while the data is transferred to the target device at the most efficient rate possible.

Compact PCI is a standard that is related to PCI. Compact PCI is a combination of several well-developed technologies, including PCI bus technology, Eurocard mechanical technology (e.g., as used in VMEbus systems), and pin and socket connector technology. The combination of these technologies results in a rugged, reliable package for PCI devices.

The Compact PCI standard also provides for several levels of hot swapping. "Hot swapping" refers to installing or removing devices from a computer while the computer is operating. Hot swapping is useful because it allows components to be replaced or upgraded without necessitating any downtime in the system. This is particularly important in applications such as network servers, routers, voice mail servers, and other systems which must be online all of the time.

While the PCI standard supports Hot Plug operation, the hot swapping functionality of Compact PCI has several advantages. PCI Hot Plug operation relies on the motherboard of the system. The motherboard must include circuitry which allows the live insertion and extraction of PCI devices. Compact PCI, on the other hand, uses what may be referred to as a passive backplane philosophy, relying on the plug-in cards themselves, rather than the backplane, to implement the isolation circuitry necessary to provide hot swap capability.

Because hot swapping is useful in systems which must be continuously operational, many such systems are being upgraded or redesigned to incorporate this feature. This leads to some difficulties, however. While it is a simple matter to modify a system's hardware to incorporate Compact PCI connectors, it is more difficult to modify the hardware to accommodate the signals related to Compact PCI's hot swap capabilities. For instance, the application specific integrated circuits (ASICs) which are currently used in many devices are not designed to be hot-swap capable, so this functionality must somehow be provided. While these ASICs could be modified, this is a time-consuming and expensive proposition. Even if it were economically practical to modify the ASICs, existing device drivers could not be used with the modified ASICs, so additional time and expense would be required to rewrite the device drivers. It would therefore be desirable to provide an easy and inexpensive mechanism for enabling hot swapping while allowing existing devices and device drivers to be used.

SUMMARY OF THE INVENTION

One or more of the problems outlined above may be solved by various embodiments of the present invention. Broadly speaking, the invention comprises installing a bus bridge that has hot swap capability between the bus of a hot-swap-capable system and a non-hot-swap-capable device and thereby providing hot swap functionality for the device while allowing existing ASICs to be used in the devices and allowing existing device drivers to be used to drive the devices.

One embodiment comprises a computer system having a host processor and a hot-swap-capable device, each coupled to a Compact PCI bus. The device includes one or more application specific integrated circuits. The application specific integrated circuits use pre-existing designs to perform various functions of the device, but these designs do not provide hot swap capability. The device also includes a hot-swap-capable bus bridge which is coupled to the application specific integrated circuits and to a Compact PCI connector on the device. The bus bridge serves as an interface between the device and the Compact PCI bus. I/O (input/output) between the Compact PCI bus and the application specific integrated circuits is routed through the bus bridge. I/O between the host processor and the application specific integrated circuits is governed by one or more pre-existing drivers corresponding to the pre-existing designs of the respective application specific integrated circuits. When the device is inserted into the computer system or is removed from the system, the bus bridge provides hardware hot swap functionality for the device even though the application specific integrated circuits and drivers do not support hot swap functionality.

In one embodiment, an Intel 21554 bus bridge ("the 21554") is used to provide the hot swap functionality of the device. (Other bus bridges, including the Intel 21555, can be used in other embodiments in the same manner as the 21554—references to the 21554 in the following description are therefore intended to be construed to cover these other bus bridges.) The 21554 is configured to support Compact PCI Basic Hotswap, Full Hotswap and High Availability functions, but in its normal configuration is non-transparent. The 21554 is reprogrammed with unique identifying information which is provided to open boot PROM (OBP) firmware and operating system (OS) software when the Compact PCI bus to which it is connected is probed. This identifying information identifies the 21554 as being used in a configuration in which it is intended to emulate a transparent bridge. The OBP firmware and OS software include drivers which are configured to recognize the new identifying information that is returned by the "transparently" configured 21554 and to treat the 21554 as a transparent bridge rather than a single non-transparent device (e.g., the application specific integrated circuits on the 21554's secondary side are probed and are mapped into the same address space as the primary side.)

One embodiment comprises a method for modifying a non-hot-swap-capable device in a computer system to provide hot swap capability. The device includes one or more application specific integrated circuits. The host processor has one or more drivers corresponding to the application specific integrated circuits and configured to drive them. The method comprises installing a bus bridge in the device, wherein the bus bridge is configured to be hot-swap-capable. The bus bridge is coupled to the Compact PCI connector and serves as an interface between the Compact PCI bus to which the device is connected and the application specific integrated circuits of the device. In one embodiment, the bus bridge is non-transparent in a normal configuration. In this embodiment, the method further comprises configuring the bus bridge to emulate a transparent bridge and modifying or configuring drivers on the host processor to recognize and operate the bus bridge in its transparent configuration. The drivers may be employed by OBP firmware and/or OS software.

BRIEF DESCRIPTION OF THE DRAWINGS

Other objects and advantages of the invention will become apparent upon reading the following detailed description and upon reference to the accompanying drawings in which.

Figure 1:
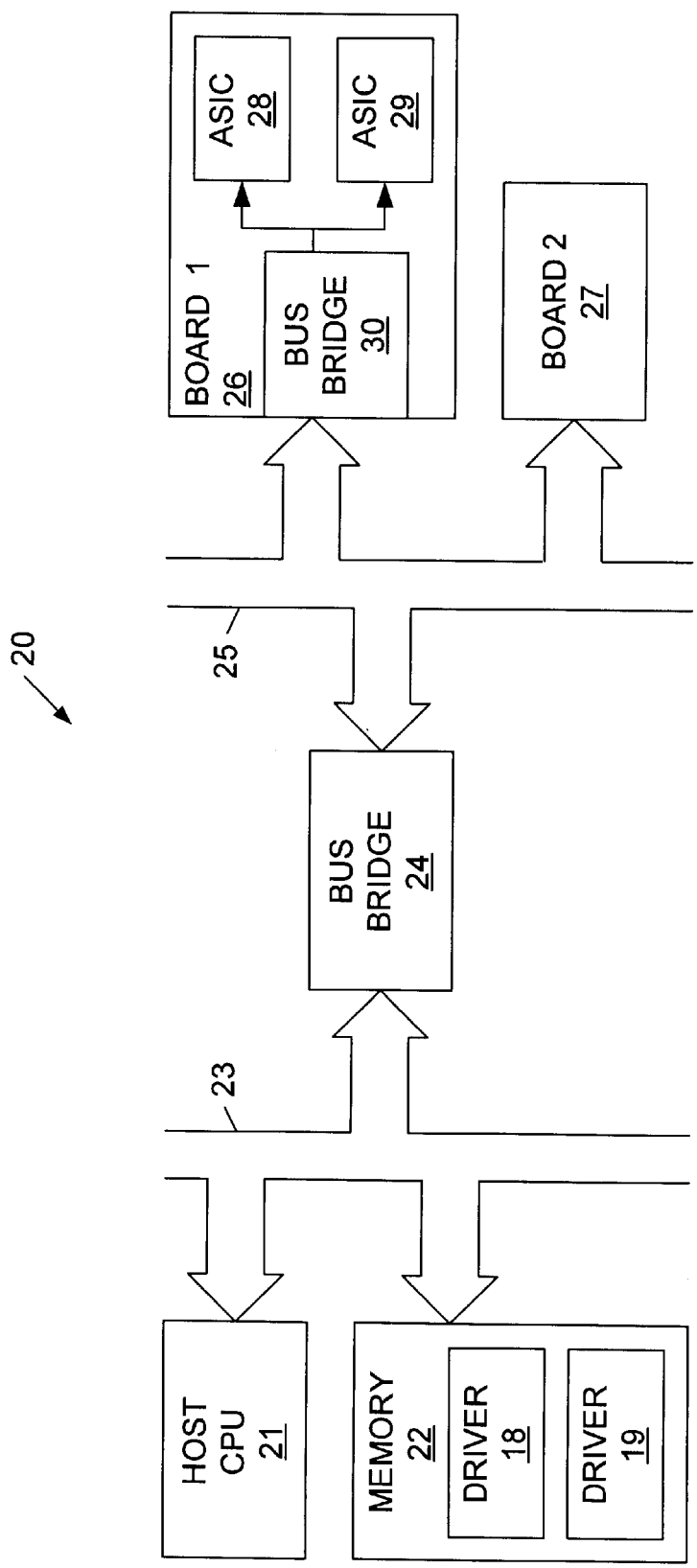
FIG. 1 is a block diagram illustrating one embodiment of the present system.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the present invention is described below. It should be noted that other embodiments are possible, and that the example which follows is intended to be illustrative rather than limiting.

Referring to FIG. 1, one embodiment of a computer system according to the present invention is shown. System 20 includes a host processor 21 and a memory 22 coupled to a local bus 23. Local bus 23 is coupled to a PCI bus 25 through a bus bridge 24. In this system, bus 25 meets the requirements of the PICMG Compact PCI Hot Swap Specification ("PICMG" refers to the PCI Industrial Manufacturers Group.) The Compact PCI bus is logically identical to a PCI bus, but it also supports features such as hot swapping, which are defined in the PICMG Compact PCI Hot Swap Specification. Boards 26 and 27 are connected to Compact PCI bus 25. Board 26 contains ASICs 28 and 29, which in this case may be driven as separate devices. Board 26 also contains bus bridge 30, which is used to couple ASICs 28 and 29 to Compact PCI bus 25. Board 26 is configured to provide hot swap capability as defined in the PICMG Compact PCI Hot Swap Specification. In this embodiment, board 27 is also configured to be hot swap capable.

ASICs 28 and 29 are the same as ASICs which are used in non-hot swap enabled versions of board 26. In other words, the ASICs were originally designed to be used in boards that were not hot swap capable. Consequently, the ASICs do not provide any support for hot swapping of boards that use these ASICs. The ASICs do not have to be modified from their non-hot swap enabled designs in order to provide hot swap capability in board 26 because this capability is provided by bus bridge 30. Since ASICs 28 and 29 do not have to be modified from their original designs, and because bus bridge 30 emulates a transparent bridge, the original drivers 18 and 19 for the ASICs can also be used in the present system without any modifications. Because the ASICs and their drivers can be used without modification in the present, hot swap enabled system, substantial time and cost savings can be achieved. (It should be noted that the functional circuitry of board 26 need not be contained in an ASIC, and that, for the purposes of this disclosure, the term "ASIC" may refer more generally to off-the-shelf ICs or other circuitry on the board which provides some specific functionality and is accessible using a corresponding driver.)

Bridge 30 is a PCI-to-PCI bridge that emulates a transparent bridge. That is, the devices coupled to the system through the bridge can be accessed as if the bridge were not present. (In this embodiment, the devices are ASICs 28 and 29.) The system does not need to know anything about the bridge in order to access the devices on the other side of it. Bus bridge 30 does not affect the communication of data between bus 25 and the ASICs on board 26. The ASICs appear to the system software as if they were each directly connected to bus 25. Thus, the drivers 18 and 19, which were written to drive ASICs 28 and 29 in a non-hot-swap-capable system, can still be used in the present system without modification.

Bus bridge 30 is configured in this embodiment to support Compact PCI Basic Hotswap, Full Hotswap and High Availability functions. ("Basic Hotswap," "Full Hotswap" and High Availability" are the three levels of hot swap functionality defined in the Compact PCI Hot Swap specification. The functionality of these three levels will be collectively referred to herein simply as hotswap functionality.) By coupling ASICs 28 and 29 to the Compact PCI bus through bridge 30, board 26 gains the hotswap functionality of the bridge, and can be inserted or removed while the system is running.

The levels of hotswap functionality are defined in the PICMG Compact PCI Hot Swap Specification. This specification is intended to provide a standard, non-proprietary approach for providing hot swap capabilities in computer systems. All of the levels of hot swap capability have to meet several basic requirements. Each level of hot swap functionality retains the features of the previous levels, and provides additional features. All of the hot swap levels require staged connector pins, the ability to electrically isolate the PCI bus circuitry, the ability to ramp up power, and the capability of providing individual clock lines on the board. Each pin has one of three lengths: long; medium; or short. The long pins are used for power and ground connections. Since these connections are made first, the board is normally fully powered up and stable before it is electrically connected to the Compact PCI backplane. This prevents power or signal transients which could otherwise occur when the board is inserted or removed. The medium pins are used to carry PCI bus signals. I/O is conveyed to and from the board using these pins. Finally, there is one short pin which, when it makes contact, indicates that the board is fully inserted. Circuitry is provided to allow power to be ramped up (and down), to put signal lines in high impedance states when the board is partially inserted, to precharge PCI signal lines, and to perform other basic functions.

A Basic Hotswap configuration meets the requirements described above. Before hot insertion or removal of a board having Basic Hotswap functionality, a user must perform some manual operations. More particularly, the user is required to manually reconfigure the operating system software and any applications which may use the board. After inserting the board, the user must initialize it, configure and add it to the list of the system's resources. Then, when the user wishes to remove the board, the software must once more be reconfigured. The user must notify the operating system and any other applications that use the board to stop using the board and to remove all drivers associated with it.

The next level of hot swap capability, Full Hotswap, includes all the features of Basic Hotswap, but automates the software reconfiguration so that no user interaction is required. In order to provide this automation when a board is removed, a Full Hotswap board incorporates a small switch which works with a front-panel ejector mechanism, a front panel LED indicator, and an ENUM line bused across the backplane. Activating the ejector mechanism activates a circuit, which in turn drives the ENUM line. This indicates to the system that the board is about to be removed. Once the system and the board have completed their dialogue (unloading drivers, etc.) the board's front panel LED is switched on to indicate that the board can be safely removed from the system. When the board is inserted in the system, the system becomes aware of the board's insertion when the short pin makes contact and the ENUM line is driven. The operating system and other software that use the board are then automatically reconfigured.

Thus, the Basic Hotswap and Full Hotswap levels of functionality differ primarily in that Full Hotswap requires no user intervention to reconfigure the software (e.g., loading/unloading drivers.) As to software configuration, Basic Hotswap can be considered manual, while Full Hotswap can be considered automatic. The High Availability level of hot swap functionality includes all the features of the lower levels (Basic Hotswap and Full Hotswap) and adds features which automate the re-configuration of the hardware as well. High Availability hot swap is designed to allow the system to automatically power down a failed board and power up an identical board which was previously unused (i.e., powered down.) A hot swap controller is used to switch between the pair of identical boards.

One of the advantages of the present system is that, in some embodiments, it may allow existing, non-hot swap capable system and component designs to be used in an upgraded (i.e., hot swap capable) system with minimal changes. Since Compact PCI implements a passive backplane methodology, most hardware modifications are confined to the Compact PCI boards which are connected to the bus. The bus itself only needs a few minor changes, such as incorporating Compact PCI connectors for the boards and providing lines to carry additional signals that hot swap capability requires. Logically, the Compact PCI bus is identical to the PCI bus. The additional hot swap signals do not change the normal activity on a PCI bus.

In some embodiments, these hardware modifications will be the only changes to the system. In some embodiments, however, additional modifications may be necessary. For example, one embodiment uses a bus bridge which is non-transparent in its normal configuration to couple the PCI devices (e.g., the standard ICs and ASICs) to the Compact PCI bus. While this bridge provides the necessary hot swap support, it cannot be used in its normal configuration because it is not transparent in this configuration. That is, the bridge appears as a single device (a leaf node) on the primary bus and the devices behind it (i.e., those which are coupled to the primary bus via the bridge) cannot be seen from the primary bus. In order to enable the system to handle the bridge as a transparent bridge, it is necessary to make minor modifications to the bridge's programming as well as the system's programming.

In one embodiment, an Intel 21554 PCI-to-PCI bridge ("the 21554") is used to provide hot swap functionality for a device coupled to the system's Compact PCI bus. The 21554 is a "type 0" PCI device (a leaf node) which is configured to function as a bridge between two processor domains. A type 0 device, or leaf node, is non-transparent. In its normal configuration, the 21554 can support independent primary and secondary address spaces and provide address translation between the primary and secondary domains. (For the purposes of this disclosure, "primary" will refer to the side of the bridge facing the host processor, while "secondary" will refer to the side of the bridge facing away from the host processor.) It should be noted that it is not important to orient the primary side of the 21554 toward the host processor and the secondary side toward the peripheral devices. The bridge may be installed with either side facing the host processor.

The 21554 is designed as a non-transparent bridge so that it can be used to provide a level of abstraction between the primary PCI bus and the secondary PCI bus. Thus, when the 21554 is used in its normal configuration, the entire subsystem which is coupled to the secondary side of the 21554 appears to the host processor (which is coupled to the primary PCI bus) as a single device. Consequently, a single device driver can be used for the entire subsystem on the secondary bus. In this configuration, the 21554 is designed to translate the address of a forwarded transaction from a system address to a local address, or vice versa. Further, an independent local processor can be used to initialize and control the devices within the subsystem. This allows the 21554 to hide subsystem resources from the host processor and to resolve resource conflicts that may exist between the host system and the local subsystem.

Figure 2:
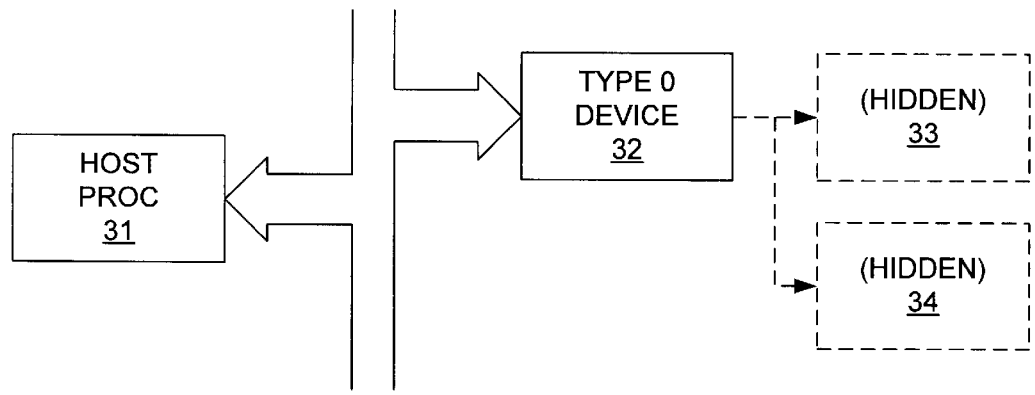
FIG. 2 is a block diagram illustrating the manner in which devices are hidden behind a type 0 ("leaf node") device.
Figure 3:
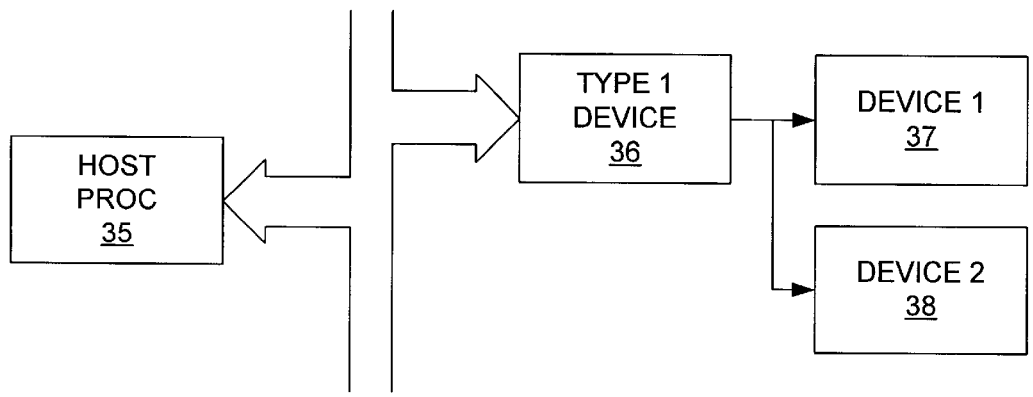
FIG. 3 is a block diagram illustrating the manner in which devices can be "seen" through a type 1 ((transparent bridge) device.

Because the 21554 is designed to hide the devices on its secondary bus from the host processor, it will not work as required for the invention when it is in its normal configuration. The 21554 must be made to appear transparent. Put another way, it must be made to emulate a "type 1" (i.e., transparent) device. The difference is illustrated in FIGS. 2 and 3. In these figures, a host processor (31 or 35) probes the system and detects a bus bridge (32 or 36.) (The system is probed at boot-up or reset and subsequent to boot-up or reset for hot swap operation.) If the bus bridge is configured as a type 0 device as shown in FIG. 2, bus bridge 32 and devices 33 and 34 appear to the host processor as a single device. If, on the other hand, the bus bridge is configured as a type 1 device as shown in FIG. 3, the host processor recognizes the bus bridge as emulating a transparent device and probes for devices on its secondary side. Host processor 35 is therefore able to "see" through bus bridge 36 to devices 37 and 38.

In one embodiment, modifications are made to the 21554 and the system in order to allow the 21554 to function as a type 1 device. It may be helpful to review the manner in which the system determines which devices are connected to the system before explaining these modifications.

As a normal PCI capability, the system probes the PCI bus at boot-up for devices which are connected to the bus. There may be up to 32 devices connected to a PCI bus, each at one of 32 predetermined addresses on the bus. The OBP firmware (the programming of the open boot PROM) is configured to query each of these addresses to determine whether a device is connected to the bus at that address. If no device is present, "ffff" is returned in response to the query. If a device is present, the vendor ID and device ID of the device are provided. After it has been determined that the device is present, the OBP firmware is configured to determine whether the device is a type 1 device or a type 0 device. The information obtained by probing the system's bus is used to build a system device tree that indicates the available devices in the system. Each non-transparent device is a leaf on the tree (i.e., a node that has no further devices beyond it.) Each transparent bus bridge is a nexus on the tree (i.e., a point at which the tree branches out to other devices.) The device tree is used to keep track of the devices and corresponding services available in the system.

Hot swap connectivity probing is provided after boot-up in essentially the same way normal PCI connectivity probing is provided at boot-up. The PCI bus is probed to determine the presence of devices on the bus and, for each device which is present, the vendor ID, device ID and type are determined. While the process of probing the bus is essentially the same during operation of the system as it is during boot-up, the process is performed by the PCI Configurator in the OS instead of the OBP firmware.

It should be noted that, while both the OBP firmware and OS software are modified in this embodiment, other embodiments may modify one, but not the other. Depending upon the platform in which the system is implemented, the OBP firmware or OS software may not require modification.

The modifications which are necessary to allow the 21554 to emulate a transparent bridge include modifications to the programming of the 21554 itself, and modifications to the drivers which are used by the OBP firmware and OS software to probe the system for active devices. Since the 21554 is normally configured to operate as a non-transparent bridge, it is necessary to provide an indication that this device is emulating a transparent bridge. This is accomplished by assigning new identifying information to the bridge when it is used in this configuration. (In order to ensure consistency in the use of the 21554 in emulating a transparent bridge, new identifying information (i.e., a class code, a subclass code and a PIF [Programming Interface] combination,) was proposed to and approved by the PCI Special Interest Group (PCI SIG.) This identifying information is stored in the 21554. Thus, when the PCI bus is probed to determine which devices are present, the 21554 will return the new identifying information, and the system will thereby be made aware that the device is a 21554 which is being used in a transparent configuration.

As noted above, modifications to the OBP firmware and OS software are also required in one embodiment. The modifications are made in the OBP and OS drivers for the 21554. The OBP driver enables transparent operation using the 21554 at boot-up, while the OS driver enables transparent operation with the 21554 while the system is up and running.

At boot-up, the OBP firmware probes the devices on the primary Compact PCI bus to determine the system configuration. This information is used to create a device tree which includes all of the devices connected to the host processor through the primary bus. When a transparent bus bridge is encountered, the secondary bus connected to the primary bus via the bridge is probed in the same manner as the primary bus.

In the present system, the OBP firmware must be configured to be aware that the 21554 is being used to emulate a transparent bridge and distinguish use of the 21554 in its non-transparent or leaf-node mode of operation. Otherwise, the 21554 would appear as a single device, and the OBP could not identify the devices which are coupled to the PCI bus through the 21554 and could not include them in the device tree. When a 21554 which is used as a transparent bridge is queried, it returns the identifying information described above to indicate that it is being used to emulate a transparent bridge. When the transparently configured 21554 is identified, the OBP firmware selects the nexus driver for the 21554. This driver allows the OBP firmware to probe the devices behind the 21554 (i.e., the ASICs which are connected to the Compact PCI bus through the 21554,) which respond in the same manner as if they were behind a transparent bridge.

When the system is running, the PCI Configurator in the OS software performs these same functions. Instead of probing the system once, however, the PCI Configurator is configured to do so periodically or in response to assertion of the ENUM signal. In a Full Hotswap enabled system, the PCI Configurator probes the system when signals carried on the ENUM line indicate that boards have been inserted or are about to be removed.

The 21554 nexus drivers for the OBP firmware and OS software are configured to program the 21554 to forward all memory and I/O (input/output) transactions using a 1:1 address translation. In other words, the addresses are not translated at all—the devices on the primary side of the 21554 and on the secondary side of the 21554 use a single address space. (When the 21554 is used in its normal non-transparent configuration, it maps addresses from a primary-side address space to a translated secondary-side address space.) Transparent bridges (i.e., those which function transparently in their normal configurations) typically use a base and limit register interface to perform this address translation. In the 21554, the functions of the base and limit register interface can be emulated using the PCI base address registers (BARs) of the 21554. Thus, addresses falling within the range(s) defined by the BARs are automatically forwarded in the same manner as a transparent bridge.

The nexus drivers also program the 21554 with the host's DMA range so that all bus master operations on the secondary side of the 21554 are forwarded to the host using a 1:1 address translation (i.e., in the same manner as with a transparent bridge.) The BARs of the 21554 are programmed to emulate the inverse decoding logic which is used by transparent bridges to forward DMA transactions. Thus, the 21554, which is not designed to be transparent, is configured to function in essentially the same manner as a bridge which is normally transparent.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method for converting a device from a non-hot-swap-capable configuration to a hot-swap-capable configuration wherein software drivers which are configured to control the device in the non-hot-swap-capable configuration can be used to control the device in the hot-swap-capable configuration, the method comprising:

provide a device, wherein said device uses one or more pre-existing circuits and wherein said one or more pre-existing circuits are configured to be controlled by one or more corresponding pre-existing software drivers;

installing a hot-swap-capable bus bridge in said device, wherein I/O between said pre-existing circuits and said pre-existing software drivers is conveyed through said bus bridge;

configuring said bus bridge to transparently convey said I/O between said pre-existing circuits and said pre-existing software drivers;

controlling said pre-existing circuits with said pre-existing software drivers; and providing an operating system driver, wherein said operating system driver is configured to control said bus bridge to emulate a transparent bridge during normal operations of said system.

2. The method of claim 1 wherein in a normal configuration said bus bridge is non-transparent.

3. The method of claim 2 wherein said bus bridge comprises an Intel 21554 PCI-to-PCI bridge.

4. The method of claim 2 wherein configuring said bus bridge to transparently convey said I/O comprises storing unique identifying information in said bus bridge, wherein said unique identifying information identifies said bus bridge as a transparently configured bridge.

5. The method of claim 4 further comprising providing a nexus driver corresponding to said transparently configured bus bridge.

6. The method of claim 5 wherein said nexus driver is configured to recognize said unique identifying information and to control said bus bridge as a transparent bridge in response to recognizing said unique identifying information.

7. The method of claim 6 wherein said nexus driver is contained in an operating system.

8. The method of claim 6 wherein said nexus driver is contained in on-board programming of a boot prom.

9. The method of claim 5 wherein said nexus driver is configured to probe a secondary side of said bus bridge to detect devices connected to said secondary side of said bus bridge.

10. The method of claim 2 wherein said device comprises a PCI device, and wherein said bus bridge comprises a PCI-PCI bus bridge.

11. The method of claim 1 wherein said bus bridge meets Full Hotswap requirements defined in the PICMG Compact PCI Hot Swap Specification.

12. The method of claim 1 further comprising providing an on-board program driver, wherein said on-board program driver is configured to control said bus bridge to emulate a transparent bridge during boot-up and reset of said system.

13. A device configured to support hot swap using existing circuits and software drivers comprising:

a board having one or more circuits, wherein the designs of said circuits do not support hot swap;

a connector configured to couple said board to a bus; and a bus bridge installed on said board, wherein said bus bridge is configured to support hot swap, wherein said bus bridge is coupled between said circuits and said connector to convey I/O between said circuits and said connector, wherein said bus bridge is configured to emulate a transparent bridge.

14. The device of claim 13 wherein said bus bridge comprises a type 0 (leaf node) device which has been configured to emulate a type 1 (transparent bridge) device.

15. The device of claim 14 wherein said bus bridge is selected from the group consisting of: an Intel 21554 PCI-to-PCI bridge; and an Intel 21555 PCI-to-PCI bridge.

16. The device of claim 14 wherein said bus bridge is configured to store unique identifying information indicative that said bus bridge is configured to emulate a transparent bridge.

17. The device of claim 13 wherein said connector is a Compact PCI connector.

18. A system comprising:

a host processor;

a bus coupled to said host processor;

a device coupled to said bus, wherein said device includes an circuit which does not support hot swap functionality, wherein said device further includes a bus bridge configured to convey I/O between said bus and said circuit, wherein said bus bridge is further configured to support hot swap functionality;

wherein said bus bridge comprises a type 0 (leaf node) device which has been configured to emulate a type 1 (transparent) device; and an operating system driver executable by said host processor, wherein said operating system driver is configured to recognize said bus bridge as being configured to emulate a transparent bridge and to probe a secondary side of said bus bridge to detect said circuit.

19. The system of claim 18 further comprising an OBP driver executable by said host processor, wherein said OBP driver is configured to recognize said bus bridge as emulating a transparent bridge at boot-up and to probe a secondary side of said bus bridge to detect said circuit.

20. The system of claim 18 wherein said bus bridge is configured to implement a 1:1 address mapping between an address space on a primary side of said bus bridge and an address space on a secondary side of said bus bridge.

21. A method for converting a device from a non-hot-swap-capable configuration to a hot-swap-capable configuration wherein software drivers which are configured to control the device in the non-hot-swap-capable configuration can be used to control the device in the hot-swap-capable configuration, the method comprising:

providing a device, wherein said device uses one or more pre-existing circuits and wherein said one or more pre-existing circuits are configured to be controlled by one or more corresponding pre-existing software drivers;

installing a hot-swap-capable bus bridge in said device, wherein I/O between said pre-existing circuits and said pre-existing software drivers is conveyed through said bus bridge;

configuring said bus bridge to transparently convey said I/O between said pre-existing circuits and said pre-existing software drivers;

controlling said pre-existing circuits with said pre-existing software drivers;

wherein in a normal configuration said bus bridge is non-transparent;

wherein configuring said bus bridge to transparently convey said I/O comprises storing unique identifying information in said bus bridge, wherein said unique identifying information identifies said bus bridge as a transparently configured bridge;

wherein the method further comprises providing a nexus driver corresponding to said transparently configured bus bridge; and wherein said nexus driver is configured to recognize said unique identifying information and to control said bus bridge as a transparent bridge in response to recognizing said unique identifying information.

22. A method for converting a device from a non-hot-swap-capable configuration to a hot-swap-capable configuration wherein software drivers which are configured to control the device in the non-hot-swap-capable configuration can be used to control the device in the hot-swap-capable configuration, the method comprising:

providing a device, wherein said device uses one or more pre-existing circuits and wherein said one or more pre-existing circuits are configured to be controlled by one or more corresponding pre-existing software drivers;

installing a hot-swap-capable bus bridge in said device, wherein I/O between said pre-existing circuits and said pre-existing software drivers is conveyed through said bus bridge;

configuring said bus bridge to transparently convey said I/O between said pre-existing circuits and said pre-existing software drivers;

controlling said pre-existing circuits with said pre-existing software drivers;

wherein in a normal configuration said bus bridge is non-transparent;

wherein configuring said bus bridge to transparently convey said I/O comprises storing unique identifying information in said bus bridge, wherein said unique identifying information identifies said bus bridge as a transparently configured bridge;

further comprising providing a nexus driver corresponding to said transparently configured bus bridge; and wherein said nexus driver is contained in on-board programming of a boot prom.

23. A system comprising:

a host processor;

a bus coupled to said host processor;

a device coupled to said bus, wherein said device includes an circuit which does not support hot swap functionality, wherein said device further includes a bus bridge configured to convey I/O between said bus and said circuit, wherein said bus bridge is further configured to support hot swap functionality;

wherein said bus bridge comprises a type 0 (leaf node) device which has been configured to emulate a type 1 (transparent) device; and further comprising an OBP driver executable by said host processor, wherein said OBP driver is configured to recognize said bus bridge as emulating a transparent bridge at boot-up and to probe a secondary side of said bus bridge to detect said circuit.

* * * * *